(No Model.) 3 Sheets—Sheet 1.
C. W. KING.
PORTABLE BOAT.
No. 507,439. Patented Oct. 24, 1893.
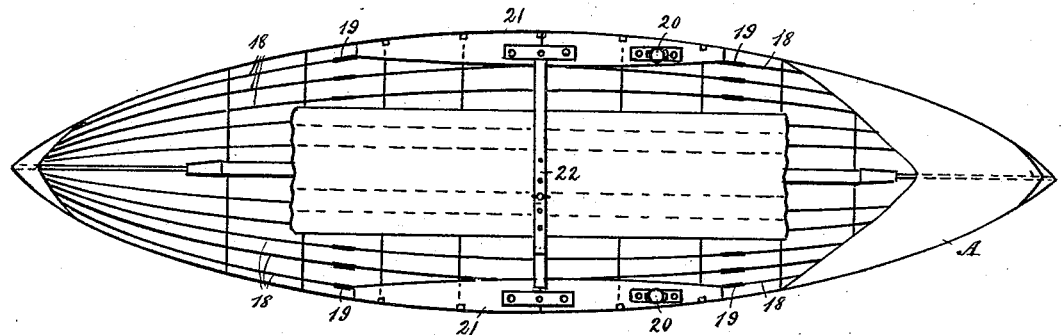
Fig. I.
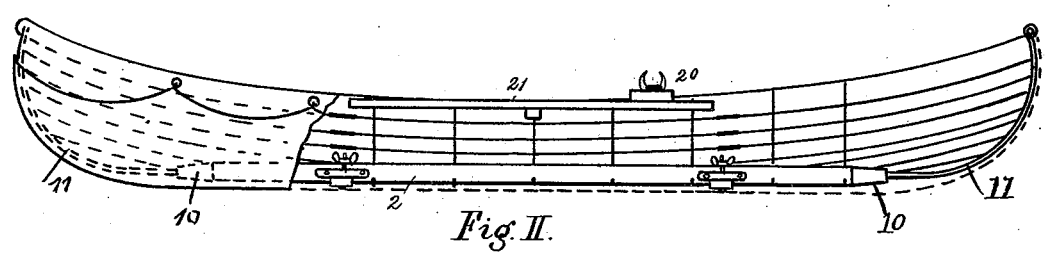
Fig. II.
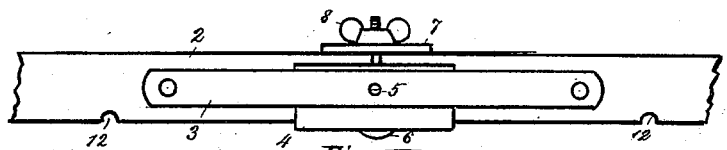
Fig. IV.
Fig. III.
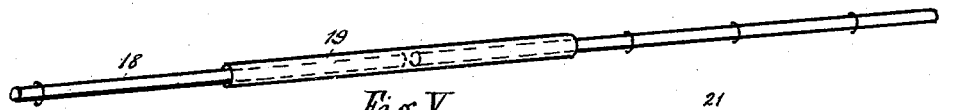
Fig. V.
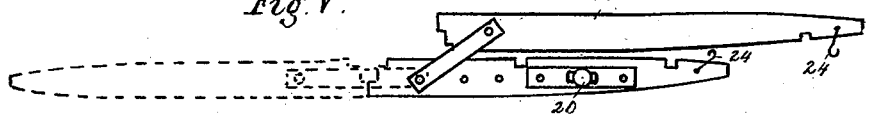
Fig. VI.
Witnesses
R. S. Millar
L. M. Adams
Inventor
Chas. W. King
by J. Bailey Atty (No Model.) 3 Sheets—Sheet 2.
C. W. KING.
PORTABLE BOAT.
No. 507,439. Patented Oct. 24, 1893.
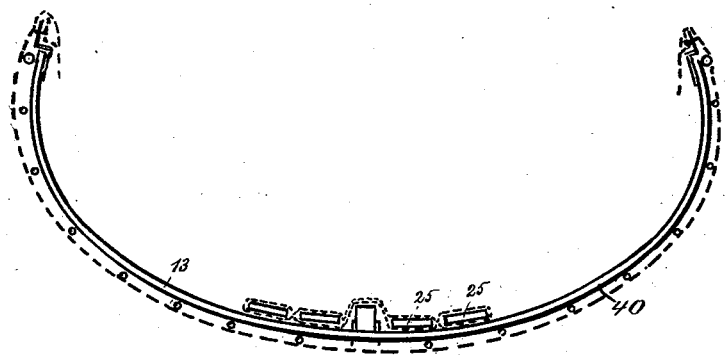
Fig. VII.
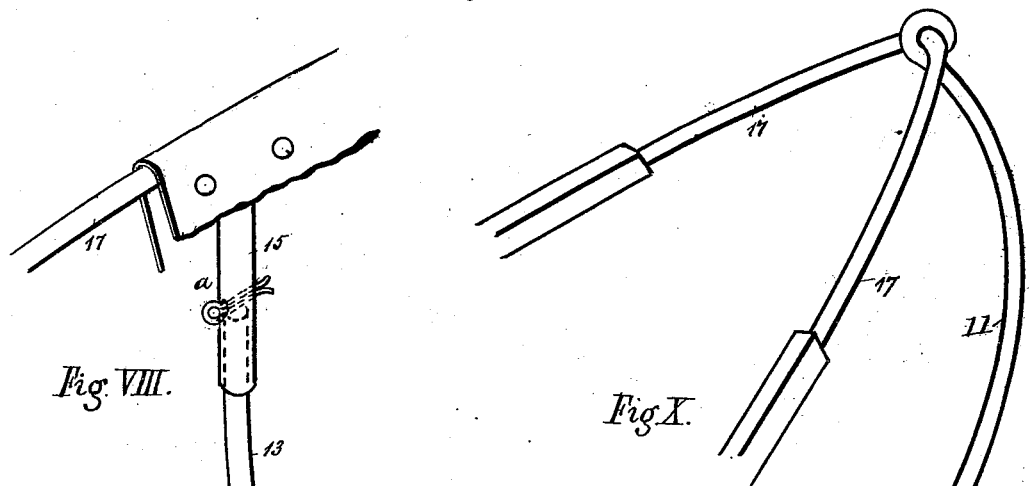
Fig. VIII. Fig. X.
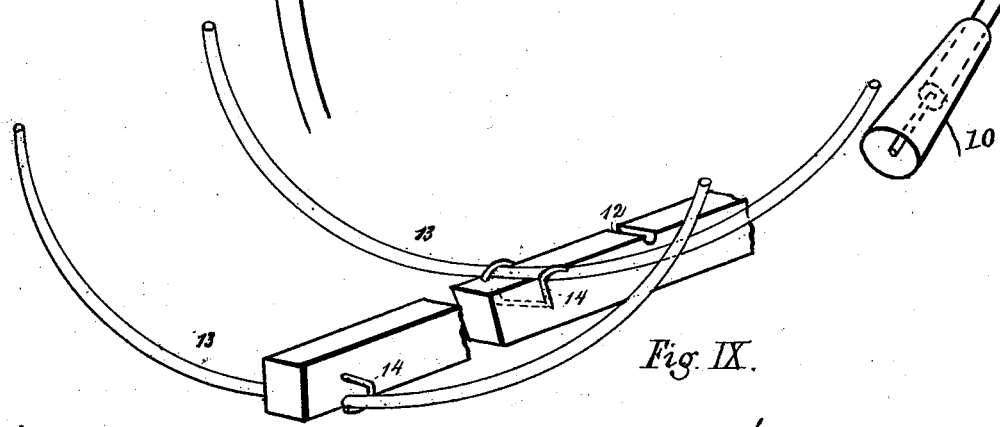
Fig. IX.
Witnesses
R. S. Millar
L. M. Adams
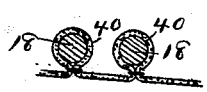
Fig. XVI.
Inventor
Chas. W. King
by J. Bailey Atty.

(No Model.) 3 Sheets—Sheet 3.
C. W. KING.
PORTABLE BOAT.
No. 507,439. Patented Oct. 24, 1893.
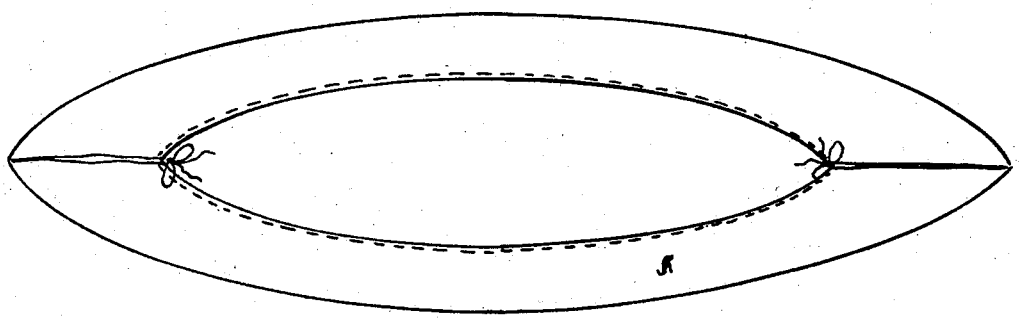
Fig. XV.
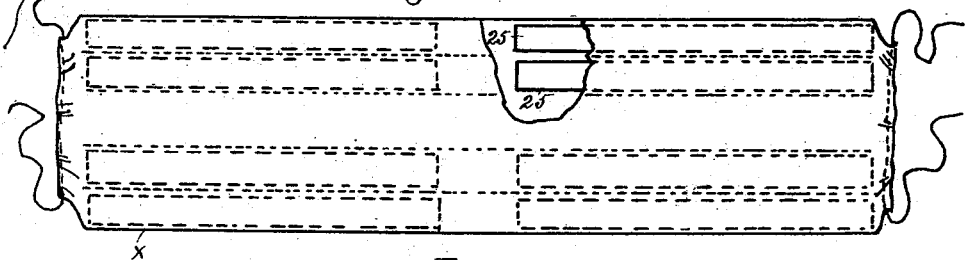
Fig. XI.
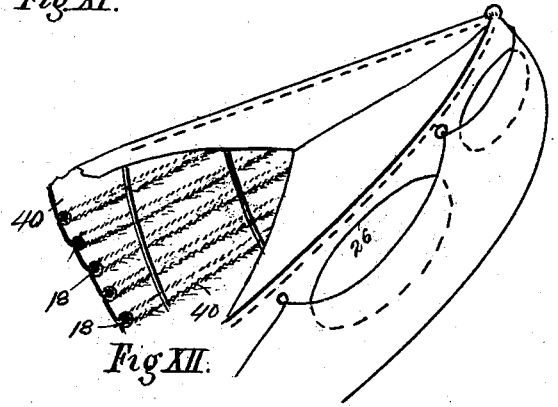
Fig. XII.
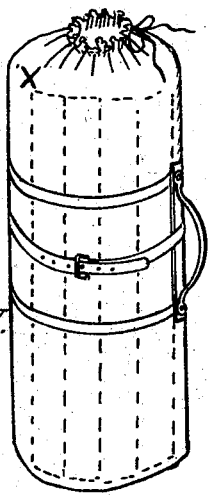
Fig. XIV.
Fig. XIII.
Witnesses
R. S. Millar
L. M. Adams
Inventor
Chas. W. King.
By O. J. Bailey Atty.

UNITED STATES PATENT OFFICE.

CHARLES W. KING, OF KALAMAZOO, MICHIGAN.

PORTABLE BOAT.

SPECIFICATION forming part of Letters Patent No. 507,439, dated October 24, 1893.

Application filed February 11, 1893. Serial No. 461,978. (No model.)

*To all whom it may concern:*

Be it known that I, CHARLES W. KING, a citizen of the United States, residing at Kalamazoo, in the county of Kalamazoo and State of Michigan, have invented a new and useful Improvement in Portable Boats, which improvement is fully set forth in the following specification and accompanying drawings, in which—

Figure I is a plan view of my improved portable boat, the decking being removed, to show the flexible flooring, the supports for the oar-locks, the adjustable spreading bar and the longitudinal ribs with their connecting tubes. Fig. II is a side elevation, partly in section; Figs. III and IV, details of the keel sections and the hinged joints which connect them; Fig. V, a detail of the tubular connections which unite the ends of the longitudinal ribs; Fig. VI, a detail view of the hinged block which supports the oar-locks; Fig. VII, a transverse section of the boat; Fig. VIII, a detail in perspective showing a section of the gunwale, and the clip attached thereto having a thimble adapted to engage the end of a transverse rib; Fig. IX, detailed portions of the invertible keel and the manner of attaching the transverse ribs above and below the same; Fig. X, a detail showing the connection of the gunwale and the upper end of the curved extension of the keel; Fig. XI, a detail showing the construction of the flexible flooring; Fig. XII, a view of one of the air pockets; Fig. XIII, a detail view of the adjustable spreading bar or brace; Fig. XIV, a view of the boat in portable form and Fig. XV, a view of the boat prepared for service. Fig. XVI, is an enlarged detail view showing how the longitudinal ribs are stitched within tucks.

My invention relates to portable boats in general and in particular to certain valuable improvements on my Patent No. 389,017, issued September 18, 1888.

The special objects of this invention are: first, an improved method of connecting the ends of the longitudinal rib sections whereby they are made practically continuous throughout their entire extent; second, having the said ribs secured in permanent position by stitching the sections thereof within tucks or folds of the canvas or other fabric which constitutes the inner lining of the boat; third, an improved invertible keel provided with means whereby the transverse ribs may be attached underneath or on top of the same; fourth, to provide increased buoyancy of the boat by a series of air pockets located along the gunwales and beneath the deck of the boat. These and other features incidentally adapted to improve the structure and enhance its excellence will now be described.

In the accompanying drawings, A designates the outer sheath or covering of the boat. This is made of canvas or other suitable flexible material.

The keel 2 is preferably composed of three sections united by hinges consisting of sheet metal side plates 3, a reversible clip 4, located centrally within the said plates and fastened thereto by screws 5. A bolt 6 passes through the center of the clip and between the adjacent ends of the keel sections, thence through a washer 7 which overlaps the joint and is clamped thereon by a thumb nut 8. The connection of the sections is thus made rigid. The extremities of the keel are provided with ferrules 9 adapted to enter corresponding sockets or sleeves 10 attached to the upwardly curved fore and aft keel extensions 11 which form the ends of the boat. The keel is provided with a series of notches 12 to receive the transverse ribs 13, which are made of steel or other material of suitable size and form. If the boat is to be used in shallow water, the ribs are placed in the notches on the under side of the keel and secured therein by duplex hooks 14. The upper ends of the ribs are inserted in the sockets 15 depending from clips 16 which clasp the gunwales 17. A removable key $a$, passes transversely through the socket and forms a stop for the ends of the transverse ribs.

When in water of sufficient depth, the keel may be inverted bringing the notches on the upper side thereof. The ribs are placed in the notches and secured as before by the duplex hooks. When the parts are arranged in this manner, the stops $a$ are removed and the ribs allowed to extend farther upward in the sockets 15.

The advantage gained by inverting the keel will be appreciated by all practical boatmen. When the transverse ribs are arranged on top of the keel, their downward pressure produces a projection beneath the boat which operates as a center board. The tendency to a lateral drifting motion is thus prevented and the movement of the boat will be steadier and more direct. The longitudinal ribs 18 are also made of steel or other material, in sections as shown and their ends are united by sliding tubes 19. They are thus made practically continuous and of uniform stiffness throughout their entire length. They are also confined in their proper relative positions by being stitched within tucks formed in the fabric 40 which composes the inner lining of the boat. The oar locks 20 are adjustably attached to blocks 21, which may be made entire or in two sections as shown in the drawings. An adjustable spreading brace 22 provided on its ends with pins 23 engage eye-bolts fixed in the blocks and holds them in position. The ends of the blocks are also provided with hooks 24 which engage the upper ends of adjacent transverse ribs, and on their outer sides with notches which engage the ends of the transverse ribs. The blocks are thus prevented from shifting longitudinally under the action of the oars.

The flexible flooring $x$ is composed exteriorly of canvas divided longitudinally, by rows of stitching, into pockets which receive wooden strips 25 divided transversely into two groups with an interval between them. The sections may thus be folded one upon the other and serve as a covering for the other parts of the boat when folded in portable form as shown in Fig. XIV.

The air-pockets 26 are composed of an inner air-tight flexible fabric having a cover of suitable stronger material. They may be inflated in the same manner as foot-balls.

What I claim as new is—

1. In a portable boat, the combination with the gunwale and flexible sheathing, of the herein described invertible folding keel, the hinged joints adapted to unite the sections thereof; the duplex reversible hooks connecting the transverse ribs and the keel; the clips adjustably attached to the gunwale and having tubular extensions to receive the outer ends of the transverse ribs; the adjustable oar-locks and the blocks supporting the same; the longitudinally adjustable spreading bar or brace bearing against the inner sides of the supporting blocks; the longitudinal ribs arranged in sections and attached by stitching to the inner flexible lining of the boat; the removable tubular connections uniting the ends of said sections and the flexible flooring all adapted to be arranged and folded in portable form substantially as herein set forth.

2. In a boat as described, the inner flexible lining and the longitudinal ribs arranged in sections and united at their ends by removable tubular connections and attached by stitching to the said lining, all substantially as described.

3. In a portable boat, the combination with the gunwale and the invertible folding keel, jointed in sections, the transverse ribs and the duplex reversible hooks connecting ribs and keel, substantially as described.

In testimony that I claim the foregoing I have hereunto set my hand, this 2d day of February, 1893, in the presence of witnesses.

CHARLES W. KING.

Witnesses:
ALELEN B. HUNTLEY,
WARREN F. SHERMAN.